(12) United States Patent
Budge et al.

(10) Patent No.: US 10,919,204 B2
(45) Date of Patent: Feb. 16, 2021

(54) CONTINUOUS REINFORCEMENT FOR USE IN ADDITIVE MANUFACTURING

(71) Applicant: CC3D LLC, Coeur d'Alene, ID (US)

(72) Inventors: Trevor David Budge, Coeur d'Alene, ID (US); Kenneth Lyle Tyler, Coeur d'Alene, ID (US); Ryan C. Stockett, Lebanon, NH (US)

(73) Assignee: Continuous Composites Inc., Coeur d'Alene, ID (US)

( * ) Notice: Subject to any disclaimer, the term of this patent is extended or adjusted under 35 U.S.C. 154(b) by 217 days.

(21) Appl. No.: 15/862,753

(22) Filed: Jan. 5, 2018

(65) Prior Publication Data

US 2018/0207857 A1    Jul. 26, 2018

Related U.S. Application Data

(60) Provisional application No. 62/449,899, filed on Jan. 24, 2017.

(51) Int. Cl.
 *B29C 64/165*     (2017.01)
 *B29C 64/321*     (2017.01)
 (Continued)

(52) U.S. Cl.
 CPC ............ *B29C 48/12* (2019.02); *B29C 48/05* (2019.02); *B29C 48/08* (2019.02); *B29C 48/305* (2019.02); *B29C 48/35* (2019.02); *B29C 64/106* (2017.08); *B29C 64/118* (2017.08); *B29C 64/124* (2017.08); *B29C 64/129* (2017.08); *B29C 64/135* (2017.08); *B29C 64/165* (2017.08); *B29C 64/209* (2017.08);
 (Continued)

(58) Field of Classification Search
 CPC .... B29C 64/165; B29C 64/336; B29C 64/321
 See application file for complete search history.

(56) References Cited

U.S. PATENT DOCUMENTS 3,286,305 A    11/1966  Seckel
3,809,514 A     5/1974  Nunez
(Continued)

FOREIGN PATENT DOCUMENTS

DE    4102257 A1   7/1992
EP    2589481 B1   1/2016
(Continued)

OTHER PUBLICATIONS

International Search Report dated Mar. 12, 2018 for PCT/US2018/013045 to CC3D LLC Filed Jan. 10, 2017.
(Continued)

*Primary Examiner* — Timothy Kennedy
*Assistant Examiner* — Alexander A Wang
(74) *Attorney, Agent, or Firm* — Ryan Stockett (57) ABSTRACT

A continuous reinforcement is disclosed for use in additive manufacturing. The continuous reinforcement may include a plurality of continuous primary fibers oriented in a general axial direction of the continuous reinforcement. The continuous reinforcement may also include a plurality of secondary fibers interspersed with the plurality of continuous primary fibers and oriented generally orthogonal to the plurality of continuous primary fibers.

19 Claims, 3 Drawing Sheets

(51) Int. Cl.

| | | |
|---|---|---|
| *B29C 64/336* | (2017.01) | |
| *B29C 48/12* | (2019.01) | |
| *B29C 64/135* | (2017.01) | |
| *B29C 64/209* | (2017.01) | |
| *B33Y 10/00* | (2015.01) | |
| *B33Y 30/00* | (2015.01) | |
| *B29C 64/371* | (2017.01) | |
| *B29C 48/08* | (2019.01) | |
| *B29C 48/35* | (2019.01) | |
| *B29C 48/305* | (2019.01) | |
| *B29C 64/245* | (2017.01) | |
| *B29C 64/124* | (2017.01) | |
| *B29C 70/24* | (2006.01) | |
| *B29C 70/38* | (2006.01) | |
| *B29C 64/129* | (2017.01) | |
| *B29C 70/68* | (2006.01) | |
| *B29C 48/05* | (2019.01) | |
| *B29C 64/386* | (2017.01) | |
| *B29C 64/277* | (2017.01) | |
| *B33Y 70/10* | (2020.01) | |
| *B29C 64/282* | (2017.01) | |
| *B33Y 40/20* | (2020.01) | |
| *B33Y 50/02* | (2015.01) | |
| *B33Y 70/00* | (2020.01) | |
| *B29C 64/214* | (2017.01) | |
| *B29C 64/264* | (2017.01) | |
| *B29C 64/118* | (2017.01) | |
| *B29C 64/393* | (2017.01) | |
| *B29C 64/106* | (2017.01) | |
| *B29C 70/06* | (2006.01) | |
| *B29C 64/218* | (2017.01) | |
| *B29K 105/10* | (2006.01) | |
| *B29K 105/00* | (2006.01) | |
| *B22F 7/06* | (2006.01) | |
| *B22F 3/00* | (2021.01) | |
| *B29C 33/00* | (2006.01) | |
| *B33Y 80/00* | (2015.01) | |
| *B22F 3/10* | (2006.01) | |
| *B22F 3/11* | (2006.01) | |
| *B29C 64/227* | (2017.01) | |
| *B29K 105/08* | (2006.01) | |
| *B33Y 40/00* | (2020.01) | |
| *B29B 15/12* | (2006.01) | |

(52) U.S. Cl.
CPC .......... *B29C 64/214* (2017.08); *B29C 64/218* (2017.08); *B29C 64/245* (2017.08); *B29C 64/264* (2017.08); *B29C 64/277* (2017.08); *B29C 64/282* (2017.08); *B29C 64/336* (2017.08); *B29C 64/371* (2017.08); *B29C 64/386* (2017.08); *B29C 64/393* (2017.08); *B29C 70/06* (2013.01); *B29C 70/24* (2013.01); *B29C 70/382* (2013.01); *B29C 70/384* (2013.01); *B29C 70/683* (2013.01); *B33Y 10/00* (2014.12); *B33Y 30/00* (2014.12); *B33Y 40/20* (2020.01); *B33Y 50/02* (2014.12); *B33Y 70/00* (2014.12); *B33Y 70/10* (2020.01); *B22F 3/008* (2013.01); *B22F 3/1035* (2013.01); *B22F 3/1118* (2013.01); *B22F 7/06* (2013.01); *B22F 2999/00* (2013.01); *B29B 15/122* (2013.01); *B29C 64/227* (2017.08); *B29C 2033/0005* (2013.01); *B29K 2105/0058* (2013.01); *B29K 2105/08* (2013.01); *B29K 2105/101* (2013.01); *B33Y 40/00* (2014.12); *B33Y 80/00* (2014.12)

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,580,512 A * | 12/1996 | Koon .................. B29C 70/14 264/108 |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 10,464,257 B2 * | 11/2019 | Boccaccini .............. B32B 5/26 |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |

(56) References Cited

U.S. PATENT DOCUMENTS

| | | |
|---|---|---|
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008235 A1 | 1/2017 | Tyler |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

Mahajan et al, 3D Printing of Carbon Fiber Composites with Preferentially Aligned Fibers, Proceedings of the 2015 Industrial and Systems Engineering Research Conference, 2015, pp. 2953-2961.

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

(56) References Cited

OTHER PUBLICATIONS

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.
Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).
M. Martin-Gallego et al., Epoxy-Graphene UV-Cured Nanocomposites, Polymer, vol. 52, Issue 21, pp. 4664-4669 (Sep. 2011).
P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).
S Kumar & J.-P. Kruth, Composites by Rapid Prototyping Technology, Materials and Design, (Feb. 2009).
S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).
T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.
Vincent J. Lopata et al., Electron-Beam-Curable Epoxy Resins for the Manufacture of High-Performance Composites, Radiation Physics and Chemistry, vol. 56, pp. 405-415 (1999).
Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-805 (May 15, 2012).

\* cited by examiner

CONTINUOUS REINFORCEMENT FOR USE IN ADDITIVE MANUFACTURING

RELATED APPLICATIONS

This application is based on and claims the benefit of priority from U.S. Provisional Application No. 62/449,899 that was filed on Jan. 24, 2017, the contents of which are expressly incorporated herein by reference.

TECHNICAL FIELD

The present disclosure relates generally to a reinforcement and, more particularly, to a reinforcement for use in additive manufacturing.

BACKGROUND

Continuous fiber 3D printing (a.k.a., CF3D™) involves the use of continuous fibers embedded within material discharging from a moveable print head. A matrix is supplied to the print head and discharged (e.g., extruded and/or pultruded) along with one or more continuous fibers also passing through the same head at the same time. The matrix can be a traditional thermoplastic, a powdered metal, a liquid resin (e.g., a UV curable and/or two-part resin), or a combination of any of these and other known matrixes. Upon exiting the print head, a cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although continuous fiber 3D printing provides for increased strength, compared to manufacturing processes that do not utilize continuous fiber reinforcement, when discharging relatively opaque fibers, such as carbon fibers, high-density fibers, high-concentrations of fibers, large-diameter fibers, etc., light from the cure enhancers can be blocked by the fibers. Incomplete curing of the matrix can result in structures that do not meet design speculations.

The disclosed system is directed at addressing one or more of the problems set forth above and/or other problems of the prior art.

SUMMARY

In one aspect, the present disclosure is directed to a continuous reinforcement for use in additive manufacturing. The continuous reinforcement may include a plurality of continuous primary fibers oriented in a general axial direction of the continuous reinforcement. The continuous reinforcement may also include a plurality of secondary fibers interspersed with the plurality of continuous primary fibers and oriented generally orthogonal to the plurality of continuous primary fibers.

In another aspect, the present disclosure is directed to a method of additively manufacturing a composite structure. The method may include interspersing continuous primary fibers with elongated sections of secondary fibers to form a continuous reinforcement. The method may also include directing the continuous reinforcement into a print head, wetting the continuous reinforcement with a matrix, and discharging the wetted continuous reinforcement from the print head. The method may further include directing a cure energy onto an outer surface of the wetted continuous reinforcement, and directing the cure energy through the secondary fibers to an interior of the wetted continuous reinforcement.

DETAILED DESCRIPTION

Figure 1:
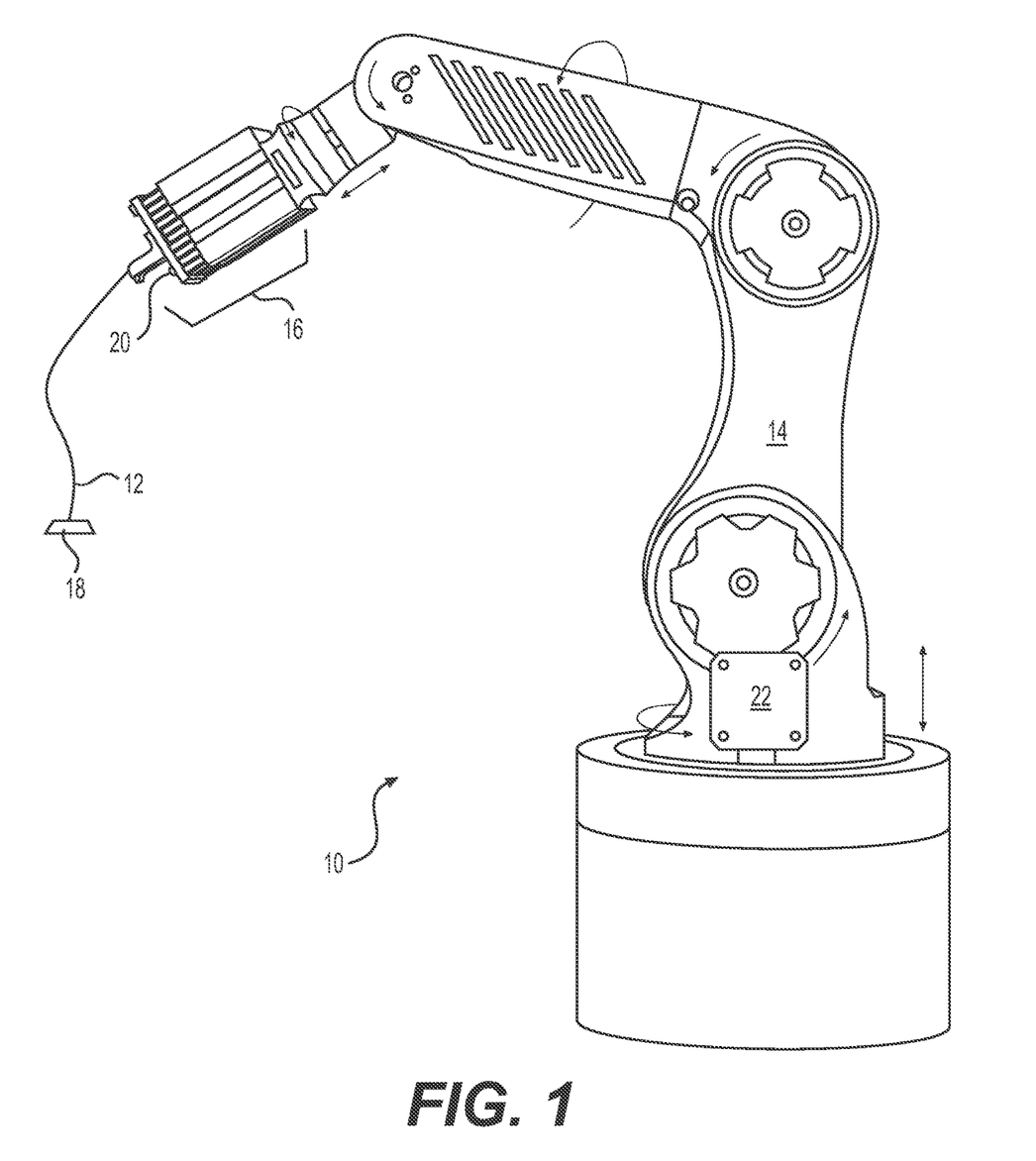
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Head 16 may be configured to receive or otherwise contain a matrix. The matrix may include any type of material (e.g., a liquid resin, such as a zero-volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16 may be pressurized, for example by an external device (e.g., an extruder or another type of pump—not shown) that is fluidly connected to head 16 via a corresponding conduit (not shown). In another embodiment, however, the matrix pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for the same reason. In either situation, head 16 may be specially configured (e.g., insulated, chilled, and/or warmed) to provide for these needs.

The matrix may be used to coat, encase, or otherwise at least partially surround any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

The reinforcements may be exposed to (e.g., coated with) the matrix while the reinforcements are inside head 16, while the reinforcements are being passed to head 16 (e.g., as a prepreg material), and/or while the reinforcements are discharging from head 16, as desired. The matrix, dry reinforcements, and/or reinforcements that are already exposed to the matrix (e.g., wetted reinforcements) may be transported into head 16 in any manner apparent to one skilled in the art.

The matrix and reinforcement may be discharged from head 16 via at least two different modes of operation. In a first mode of operation, the matrix and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix is being pulled from head 16, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from head 16 as a result of head 16 moving away from an anchor point 18. In particular, at the start of structure-formation, a length of matrix-impregnated reinforcement may be pulled and/or pushed from head 16, deposited onto anchor point 18, and cured, such that the discharged material adheres to anchor point 18. Thereafter, head 16 may be moved away from anchor point 18, and the relative movement may cause the reinforcement to be pulled from head 16. It should be noted that the movement of the reinforcement through head 16 could be assisted (e.g., via internal feed mechanisms), if desired. However, the discharge rate of the reinforcement from head 16 may primarily be the result of relative movement between head 16 and anchor point 18, such that tension is created within the reinforcement. It is contemplated that anchor point 18 could be moved away from head 16 instead of or in addition to head 16 being moved away from anchor point 18.

One or more cure enhancers (e.g., one or more light sources, an ultrasonic emitter, a laser, a heater, a catalyst dispenser, a microwave generator, etc.) 20 may be mounted proximate (e.g., on and/or trailing from) head 16 and configured to enhance a cure rate and/or quality of the matrix as it is discharged from head 16. Cure enhancer 20 may be controlled to selectively expose internal and/or external surfaces of structure 12 to energy (e.g., light energy, electromagnetic radiation, vibrations, heat, a chemical catalyst or hardener, etc.) during the formation of structure 12. The energy may increase a rate of chemical reaction occurring within the matrix, sinter the material, harden the material, or otherwise cause the material to cure as it discharges from head 16.

A controller 22 may be provided and communicatively coupled with support 14, head 16, and any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20, such that structure 12 is produced in a desired manner.

Figure 2:
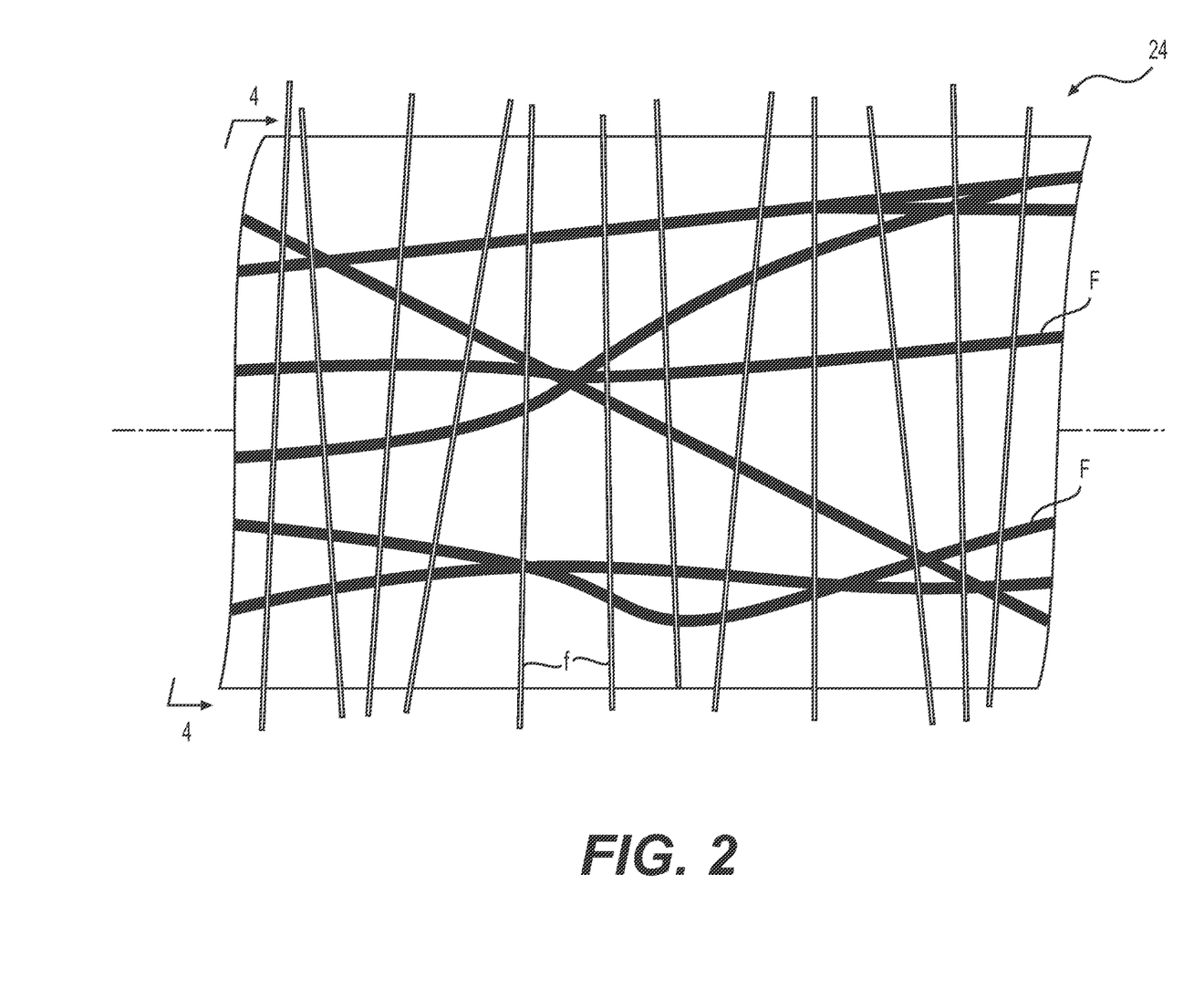
FIG. 2 is a diagrammatic illustration of an exemplary disclosed reinforcement that may be utilized with the manufacturing system of FIG. 1.

An exemplary reinforcement 24 is illustrated in FIG. 2. Reinforcement 24 may include at least one type of primary fiber (e.g., a plurality of carbon fibers) F that extends generally in an axial direction, and at least one type of secondary fiber (e.g., fiberglass, optical tubes, translucent particles, etc.) f that extends generally perpendicular (e.g., within 0° to 20° of perpendicular) to the primary fiber F. The primary fiber F may be darker (i.e., block a greater amount of light) than the secondary fiber f. The secondary fiber f may transmit light (e.g., from cure enhancers 20—referring to FIG. 1) and extends from an outer surface of reinforcement 24 (where the light is absorbed) toward a center of the primary fiber F. In one embodiment, the secondary fiber extends to the center of the primary fiber F. In another embodiment, the secondary fiber f extends through the center of the primary fiber F. And in yet another embodiment, the secondary fiber f extends completely through the center of the primary fiber F, such that both opposing ends of the secondary fiber f are exposed to the energy from cure enhancers 20. A spacing and density of secondary fibers f within reinforcement 24 may vary, and depend on the type of primary fiber F, a density of the primary fiber F, and a diameter of reinforcement 24.

Figure 3:
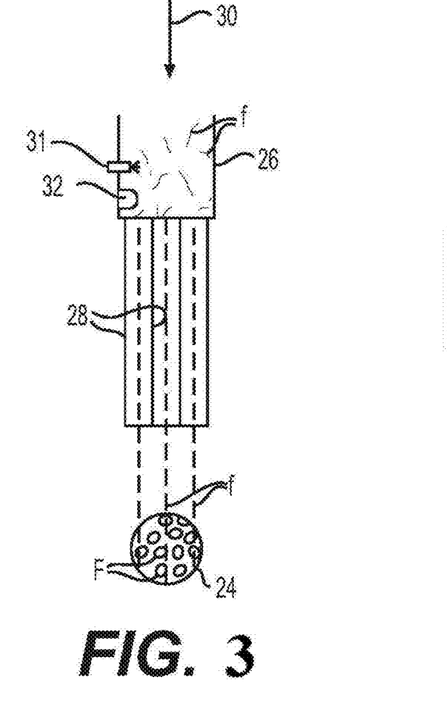
FIGS. 3, 4, 5, and 6 are diagrammatic illustrations of exemplary processes that may be used to fabricate the reinforcement of FIG. 2.

FIG. 3 illustrates an exemplary way that reinforcement 24 may be fabricated, prior to use within head 16. In this embodiment, chopped fibers may be supplied as the secondary fibers f into a hopper 26, which is connected at a lower end to one or more guides 28. The chopped fibers may be urged (e.g., by way of pressurized air 30) to pass from hopper 26 into guides 28, and guides 28 may function to axially align the chopped fibers. After traveling a distance through guides 28, the chopped fibers may be directed in a generally orthogonal direction toward a strand, tow, and/or ribbon of primary fibers F with a speed and/or force sufficient to embed the chopped fibers into a side of the primary fibers F. The primary fibers F may be unraveling from a spool (not shown) and traveling axially past an end of guides 28 at this time. After the primary fibers F are impaled with the chopped fibers, the resulting reinforcement 24 may either be respooled for later use or directed into head 16 for immediate use, as desired. It should be noted that, although the chopped fibers are shown in FIG. 3 as being directed from only one side into the primary fibers F, the chopped fibers could be directed from multiple sides.

In some embodiments, it may be possible for some of the chopped fibers embedded within the primary fibers F to subsequently fall out of reinforcement 24, unless otherwise accounted for. When this occurs inside of head 16, head 16 may become contaminated and/or clogged with the chopped fibers. For this reason, a binder (e.g., a matrix that is the same as or different from the matrix later applied within head 16) may be used to help hold the chopped fibers in place. The binder may be directed (e.g., sprayed) onto the chopped fibers (e.g., by a jet 31) while the chopped fibers are inside of hopper 26, while the chopped fibers are passing through guide(s) 28, and/or while the chopped fibers are entering the primary fibers F. It is contemplated that the binder could alternatively or additionally be applied directly to the primary fibers F, if desired. The binder may be at least partially cured (e.g., by one or more auxiliary cure enhancers 32), thereby holding the chopped fibers within the primary fibers F.

Figure 4:
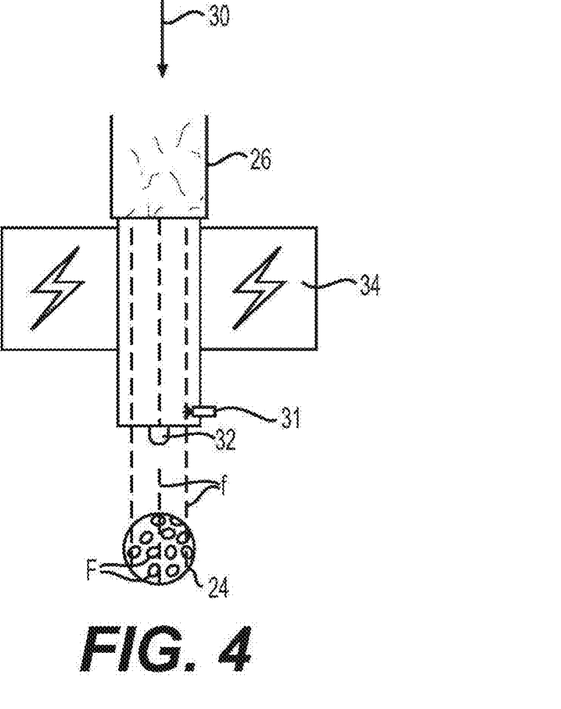

FIG. 4 illustrates another way that reinforcement 24 may be fabricated, prior to use within head 16. Like the embodiment of FIG. 3, hopper 26 may be used to hold a supply of chopped fibers to be used as the secondary fibers f inside of reinforcement 24. However, in contrast to the embodiment of FIG. 3, the embodiment of FIG. 4 does not include guides 28 that axially align the chopped fibers prior the chopped fibers impaling the primary fibers F. In place of guides 28, the embodiment of FIG. 4 may utilize a static charge generator 34 located at the lower end of hopper 26. Static charge generator 34 may be configured to generate a static charge within the chopped fibers that causes the chopped fibers to axially align themselves without the use of guides 28. In addition, FIG. 4 illustrates alternative locations for jet 31 and/or auxiliary cure enhancers 32 that are outside of hopper 26 (e.g., at an end of static charge generator 34).

Figure 5:
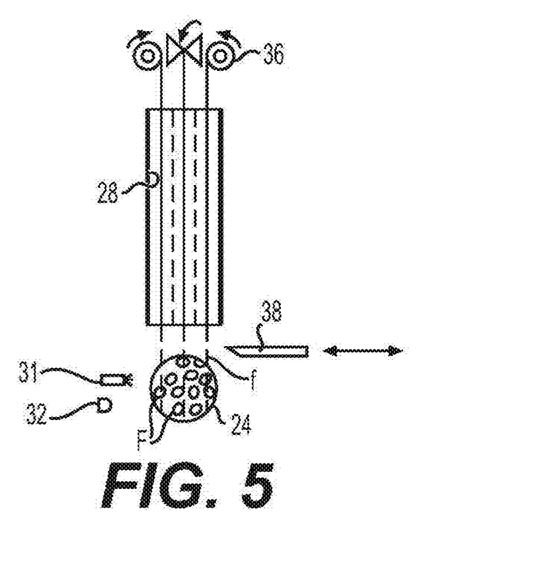

FIG. 5 illustrates another way that reinforcement 24 may be fabricated, prior to use within head 16. Unlike the previously disclosed embodiments, the embodiment of FIG. 4 discloses use of one or more continuous fibers as the secondary fibers f inside of reinforcement 24. Specifically, the continuous fibers may be pulled from one or more spools 36 and passed through one or more guides 28 that function to maintain separation between the continuous fibers. A cutting mechanism 38 may be located at lower ends of guides 28, and selectively actuated to cut off elongated sections of the continuous fibers that have been driven between the primary fibers F in reinforcement 24. Although cutting mechanism 38 is shown as a mechanical blade, it is contemplated that other types of cutting mechanisms (e.g., lasers) could alternatively or additionally be utilized, if desired. It is also contemplated that cutting mechanism 38 may be eliminated, in some embodiments, and that the axial motion of the primary fibers F past the terminal ends of guides 28, alone, may function to break off the elongated sections of the continuous fibers. In the embodiment of FIG. 5, jet 31 and/or auxiliary cure enhancer 32 may be located to focus on reinforcement 24 after the secondary fibers f are interspersed with the primary fibers F. It is also contemplated that the primary fibers may already be pre-impregnated with the binder described above, prior to impaling and cutting, if desired.

Figure 6:
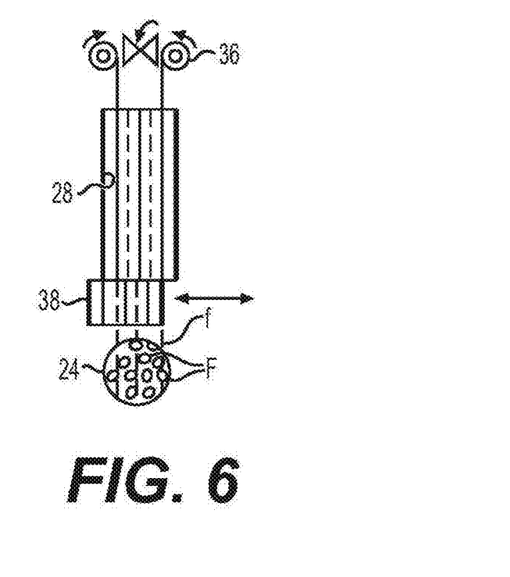

The embodiment of FIG. 6 may be similar to the embodiment of FIG. 5, but outfitted with a different cutting mechanism 38. In this embodiment, cutting mechanism 38 may shear the continuous fibers prior to and/or after impaling the primary fibers F, by translating an end portion of guides 28 relative to a remaining portion (e.g., in a radial direction relative to a longitudinal axis of guides 28).

INDUSTRIAL APPLICABILITY

The disclosed system may be used to continuously manufacture composite structures having any desired cross-sectional size, shape, length, density, and/or strength. The composite structures may include any number of different reinforcements of the same or different types, diameters, shapes, configurations, and consists, each coated with a common matrix. In addition, the disclosed reinforcement may allow for proper curing of an associated matrix saturated into the reinforcement during additive manufacturing. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.) and finishes, connection geometry (e.g., locations and sizes of couplings, tees, splices, etc.), location-specific matrix stipulations, location-specific reinforcement stipulations, etc. It should be noted that this information may alternatively or additionally be loaded into system 10 at different times and/or continuously during the manufacturing event, if desired. Based on the component information, one or more different reinforcements and/or matrixes may be selectively installed and/or continuously supplied into system 10.

Installation of reinforcement 24 (referring to FIG. 2) may be performed by passing the reinforcements down through print head 16. Installation of the matrix may include filling head 16 with matrix and/or coupling of an extruder (not shown) to head 16. Head 16 may then be moved by support 14 under the regulation of controller 22 to cause matrix-coated reinforcements 24 to be placed against or on a corresponding anchor point 18. Cure enhancers 20 within head 16 may then be selectively activated to cause hardening of the matrix surrounding the reinforcements, thereby bonding the reinforcements to anchor point 18.

The component information may then be used to control operation of system 10. For example, reinforcements 24 may be pulled and/or pushed from head 16 (along with the matrix that is saturated throughout the primary and secondary fibers F,f), while support 14 selectively moves head 16 in a desired manner during exposure of the matrix-coated reinforcement 24 to cure energy, such that an axis of the resulting structure 12 follows a desired trajectory (e.g., a free-space, unsupported, 3-D trajectory). As the cure energy from cure enhancers 20 exposes an outer surface of the matrix-coated reinforcement 24 to cure energy, at least some of the cure energy may be transported radially inward via secondary fibers f, thereby exposing any matrix inside of reinforcement 24 and causing the matrix to cure. Once structure 12 has grown to a desired length, structure 12 may be disconnected (e.g., severed) from head 16 in any desired manner.

It will be apparent to those skilled in the art that various modifications and variations can be made to the disclosed continuous reinforcement. Other embodiments will be apparent to those skilled in the art from consideration of the specification and practice of the disclosed continuous reinforcement. It is intended that the specification and examples be considered as exemplary only, with a true scope being indicated by the following claims and their equivalents.

What is claimed is:

1. A method of additively manufacturing a composite structure, comprising:
   interspersing continuous primary fibers with elongated sections of secondary fibers to form a continuous reinforcement, wherein a majority of the elongated sections of secondary fibers extend within 0-20° of orthogonal to the continuous primary fibers and at least to an axial center of the continuous reinforcement;
   directing the continuous reinforcement into a print head;
   wetting the continuous reinforcement with a matrix;
   discharging the wetted continuous reinforcement from the print head;
   directing a cure energy from a print head-mounted cure enhancer onto an outer surface of the wetted continuous reinforcement as the wetted continuous reinforcement discharges from the print head; and
   directing the cure energy through the elongated sections of secondary fibers to the axial center of the continuous reinforcement.

2. The method of claim 1, further including moving the print head during discharging, such that an axis of the continuous reinforcement has a 3-dimensional trajectory.

3. The method of claim 1, wherein the continuous primary fibers are energy-blocking.

4. The method of claim 1, further including applying a binder to at least one of the elongated sections of secondary fibers and the continuous primary fibers and partially curing the binder to bind the elongated sections of secondary fibers to the continuous primary fibers prior to directing the continuous reinforcement into the print head, wherein the binder is different from the matrix.

5. The method of claim 1, wherein interspersing the continuous primary fibers with the elongated sections of secondary fibers includes directing the elongated sections from a hopper through a guide to orient the elongated sections relative to the continuous primary fibers.

6. The method of claim 1, wherein interspersing the continuous primary fibers with the elongated sections of secondary fibers includes directing the elongated sections from a hopper through a static electricity generator to orient the elongated sections relative to the continuous primary fibers.

7. The method of claim 1, wherein interspersing the continuous primary fibers with the elongated sections of secondary fibers includes urging the elongated sections with pressurized air toward the continuous primary fibers.

8. The method of claim 1, wherein interspersing the continuous primary fibers with the elongated sections of secondary fibers includes:
   directing continuous strands of the secondary fibers towards the continuous primary fibers; and
   severing the continuous strands of the secondary fibers to form the elongated sections.

9. The method of claim 8, wherein severing the continuous strands of the secondary fibers includes severing the continuous strands after the continuous strands have penetrated the continuous primary fibers.

10. A method of additively manufacturing a composite structure, comprising:
    interspersing energy-blocking fibers with energy-passing fibers, wherein interspersing the energy-blocking fibers with the energy-passing fibers includes orienting a majority of the elongated sections of the energy-passing fibers within 0-20° of orthogonal to the energy-blocking fibers and the elongated sections of the energy-passing fibers extend at least to an axial center of a tow of the energy-blocking fibers;
    chemically binding the energy-passing fibers to the energy-blocking fibers with a binder to form a continuous reinforcement;
    directing the continuous reinforcement into a print head;
    wetting the continuous reinforcement with a matrix that is different from the binder;
    discharging the wetted continuous reinforcement from the print head;
    directing a cure energy onto an outer surface of the wetted continuous reinforcement; and
    directing the cure energy through the energy-passing fibers to the axial center of the tow of the energy-blocking fibers.

11. The method of claim 10, further including moving the print head during discharging, such that an axis of the continuous reinforcement has a multi-dimensional trajectory.

12. The method of claim 10, wherein the energy-blocking fibers are carbon fibers.

13. The method of claim 12, wherein the energy-passing fibers are glass fibers.

14. The method of claim 10, wherein interspersing the energy-blocking fibers with the energy-passing fibers includes directing the energy-passing fibers from a hopper through a guide to orient elongated sections of the energy-passing fibers relative to the energy-blocking fibers.

15. The method of claim 10, wherein interspersing the energy-blocking fibers with the energy-passing fibers includes directing elongated sections of the energy-passing fibers from a hopper through a static electricity generator to orient the elongated sections relative to the energy-blocking fibers.

16. The method of claim 10, wherein interspersing the energy-blocking fibers with the energy-passing fibers includes urging the energy-passing fibers with pressurized air toward the energy-blocking fibers.

17. The method of claim 10, wherein interspersing the energy-blocking fibers with the energy-passing fibers includes:
    directing continuous strands of the energy-passing fibers towards the energy-blocking fibers; and
    severing the continuous strands of the energy-passing fibers to form elongated sections.

18. The method of claim 17, wherein severing the continuous strands of the energy-passing fibers includes severing the continuous strands of the energy-passing fibers after the continuous strands of the energy-passing fibers have penetrated the energy-blocking fibers.

19. The method of claim 10, wherein directing the cure energy onto an outer surface of the wetted continuous reinforcement and directing the cure energy through the energy-passing fibers to an axial center of the wetted continuous reinforcement includes directing the cure energy from a print head-mounted cure enhancer to the wetted continuous reinforcement as the wetted continuous reinforcement discharges from the print head.

\* \* \* \* \*